United States Patent [19]
Harada et al.

[11] Patent Number: 4,772,994
[45] Date of Patent: Sep. 20, 1988

[54] POWER SOURCE USING HIGH-FREQUENCY PHASE CONTROL

[75] Inventors: Koosuke Harada; Hiroshi Sakamoto; Masahito Shoyama, all of Fukuoka, Japan

[73] Assignee: Nishimu Electronics Industries, Co., Ltd., Fukuoka, Japan

[21] Appl. No.: 95,322

[22] Filed: Sep. 10, 1987

[51] Int. Cl.⁴ ............... H02M 7/538; H02M 7/5387; H02M 7/5395

[52] U.S. Cl. ..................................... 363/8; 363/163; 363/164; 363/165

[58] Field of Search .................. 363/8, 17, 24–26, 363/159, 160, 164, 165

[56] References Cited

U.S. PATENT DOCUMENTS

| | | | |
|---|---|---|---|
| 3,246,231 | 4/1966 | Clarke | 363/164 |
| 3,517,300 | 6/1970 | McMurray | 363/25 |
| 4,122,514 | 10/1978 | Amin | 363/17 |
| 4,399,499 | 8/1983 | Butcher et al. | 363/17 |

FOREIGN PATENT DOCUMENTS

WO82/02134  6/1982  PCT Int'l Appl. ............ 363/8

Primary Examiner—William H. Beha, Jr.
Attorney, Agent, or Firm—Kinney & Lange

[57] ABSTRACT

A power source using high-frequency phase control possessing an ability to cause the transfer of electric power between a power source side and a load side to be made through a high-frequency transformer and to effect control of the output voltage by subjecting the power source side and the load side circuits to on-off control with a certain phase difference. This power source can be used as an uninterruptible power source, a device for controlled drive of a motor, a DC constant-voltage power source, or a constant-current device, for example.

6 Claims, 4 Drawing Sheets (a)

(b)

(c)

POWER SOURCE USING HIGH-FREQUENCY PHASE CONTROL

BACKGROUND OF THE INVENTION

1. Field of the Invention

This invention relates to a power source for deriving from a DC power source desired DC output, sine-wave AC output, etc. having voltages different from the voltage of the DC power source, and more particularly to a power source of the type using a high-frequency phase difference control and possessing an ability to cause the transfer of electric power between the power source side and the load side to be made through a high-frequency transformer and to effect control of the output voltage by subjecting the power source side (input side) and the load side circuits to ON-OFF control with a certain phase difference, where the power source side and the load side are required to be isolated from each other in terms of DC.

This device can be advantageously used as an uninterruptible power source, a device for controlled drive of a motor, a DC constant-voltage power source, or a constant-current device, for example.

2. Description of the Prior Art

Most, if not all, recent data processing devices are unable to tolerate an interruption of power supply even momentarily. In these circumstances, uninterruptible AC power sources which are provided with an inverter and enabled to derive a sine-wave AC output from a DC power source by switching the DC power source have been finding growing utility in actual applications. In this case, more often than not there arises a need for keeping the sine-wave AC output isolated from the DC power source in terms of DC.

FIG. 1, FIG. 2, and FIG. 3 are block diagrams illustrating configurations of conventional AC power sources of the type deriving a sine-wave AC output by the ON-OFF control of a DC power source. In these diagrams, like symbols denote identical or similar parts.

In the power source of FIG. 1, the electric power from a DC power source 1 is converted into an AC having the frequency of a commercial power supply by a switching device 2 which is adapted to derive a sine-wave AC output by the On-OFF control of a switching element incorporated therein, and the AC power thus produced is supplied via a transformer 3 to a load 4 ("Principles of Inverter Circuits," pp 310 to 318, written by B. D. Bedford et al. and published by John Wiley & Sons, Inc.).

This power source has a disadvantage that since the AC power of a low frequency (50 or 60 Hz) is transmitted via the transformer 3 to the load, 4, the transformer 3 suitable for these frequencies occupies a large space and is heavy.

In the power source of FIG. 2, the electric power from the DC power source 1 is converted into an AC of high frequency by a DC-AC converter 5 and then supplied via a high-frequency transformer 3H to a rectifier 6. The DC out having the rectifier 6 is converted into a sine-wave AC of the frequency of a commercial power supply by the same switching device as used in the power source of FIG. 1 and the produced AC is supplied to the load 4.

In the power source of FIG. 2, since the electric power is transmitted in the form of a high-frequency AC via the transformer 3H, the high-frequency transformer 3H is not so bulky as mentioned above. On the other hand, however, this power source has a disadvantage that since the rectifier 6 is an unidirectional element restricting the flow of electric power to only one direction and the reactive power is not regenerated in the power source and tends to give rise to a surge voltage where the load is other than a pure resistance. The power source requires a measure for preventing the adverse effect of the reactive power which significantly complicates the configuration of circuit.

In the power source of FIG. 3, the electric power from the DC power source 1 is converted by a switching device 2P into a high-frequency AC which is pulse-width-modulated in the form of a full-wave rectified sine wave and supplied to the high-frequency transformer 3H. The high-frequency AC secondary output of the transformer 3H is rectified by the rectifier 6 to be converted into a full-wave rectified sine-wave AC and then is converted further by an unfolding circuit 7 such as a bridge circuit into a sine-wave AC with the commercial frequency (an article written by Alan Cocconi et al. under the title of "High Frequency Isolated 4 KW Photovoltaic Inverter For Utility Interface" at pages 325 through 345 in "ADVANCES IN SWITCHED-MODE POWER CONVERSION," Vol. III, published by TESLA Co.).

The power source of FIG. 3, similarly to that of FIG. 2, enjoys freedom from undue volume and weight of the transformer 3. Similar to the power source of FIG. 2, however, it has a disadvantage in that it requires a measure for preventing the otherwise inevitable occurrence of a surge voltage due to the reactive power which complicates the configuration of circuit.

BRIEF SUMMARY OF THE INVENTION

This invention has been provided for the purpose of eliminating the disadvantages suffered by the conventional power sources as described above. It aims to provide a power source of the type using a high-frequency phase control which permits efficient regeneration of the reactive power without either entailing complication of the configuration of circuit or necessitating an increase of the dimensions, volume, or weight of the transformer.

To be more specific, objects of this invention are to provide a power source of the type using a high-frequency phase difference control which allows a DC output, a sine wave AC output, or other outputs of desired waveform or voltage to be derived from a DC power source through the medium of an ON-OFF control switching element and a high-frequency transformer, to provide a simplification of the configuration of circuit and reduction of the volume, weight, and dimensions of the entire device, and to provide a highly reliable operation, and realizes high economy of the device.

DETAILED DESCRIPTION OF THE PREFERRED EMBODIMENTS

Figure 1:
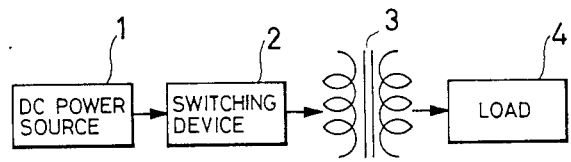
FIG. 1, FIG. 2, and FIG. 3 are block diagrams illustrating configurations of conventional AC power sources of the type deriving a sine-wave AC output from a DC power source.
Figure 2:
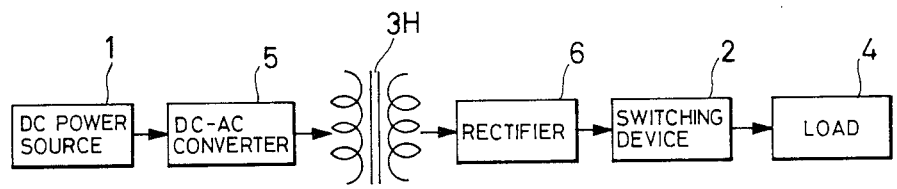
Figure 3:
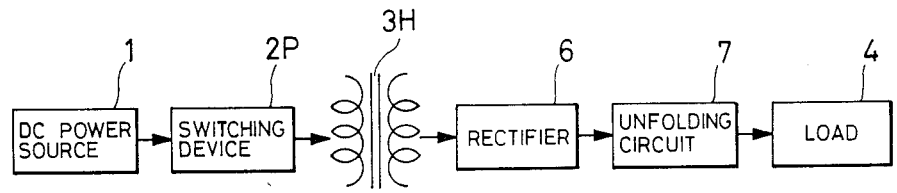
Figure 4:
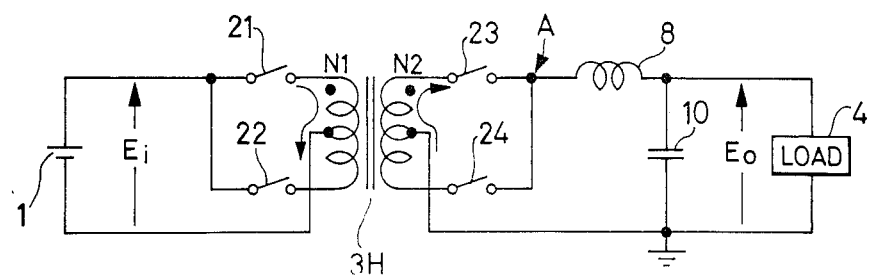
FIG. 4 is a circuit diagram illustrating the operating principle of the present invention.
Figure 5:
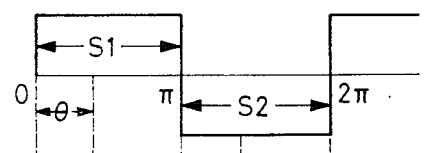
FIGS. 5a to 5c are waveform diagrams for aiding in the description of the operation of the embodiment of FIG. 4.
Figure 5:
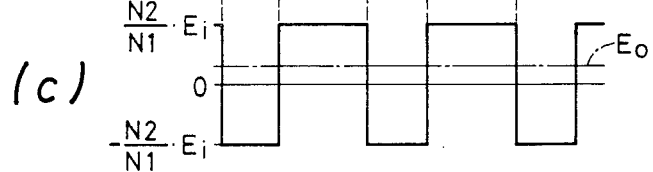

FIG. 4 depicts a principal embodiment of the present invention having a power source of the type using a high-frequency phase control. FIG. 5 is a time chart drawn to aid in the description of the operation of the device of FIG. 4.

In FIG. 4, the opposite terminals of a primary winding of a high-frequency transformer 3H are each connected through the medium of a switch 21 and a switch 22, respectively, to one terminal (positive terminal) of a DC power source 1. A center tap of the primary winding is connected to the other terminal (negative terminal) of the DC power source 1. The opposite terminals of the secondary winding of the high-frequency transformer 3H are each connected through the medium of a switch 23 and a switch 24 respectively, to a circuit node and are further connected to one end of a load 4 through the medium of a reactor 8. A center tap of the secondary winding is connected to the other end of the load 4. Further, to the load 4 is connected in parallel therewith a capacitor 10. The small black dot indicated at one end of each of the windings, represents the polarity of the winding and N1 and N2 denote the numbers of turns in the first and second windings of the transformer 3H.

In the waveforms (a) and (b) illustrated in FIG. 5, S1, S2, S3, and S4 denote the ON or closed switch periods of switches 21, 22, 23, and 24 respectively. As clearly noted from the diagram, the periods S1 through S4 have equal durations for retaining the ON state, alternate with one another and so do the periods S1 and S2 and the periods S3 and S4 as switches 21 through 24 are alternately subjected in corresponding pairs to ON-OFF control at fixed equal intervals.

Where a phase difference of $\theta$ exists as illustrated in FIG. 5 between the series of ON periods, S3 and S4, of the switches 23 and 24 on one hand and the series of ON periods, S1 and S2, of the switches 21 and 22, a modulated rectangular voltage waveform illustrated in FIG. 5(c) is issued at node A of FIG. 4.

To be more specific, the combinations of ON-OFF states of the individual switches are divided into the four kinds as shown in Table 1 below.

TABLE 1

| State | A | B | C | D |
|---|---|---|---|---|
| Switch 21 | ON | ON | OFF | OFF |
| Switch 22 | OFF | OFF | ON | ON |
| Switch 23 | ON | OFF | OFF | ON |
| Switch 24 | OFF | ON | ON | OFF |
| Voltage at Point A | + | − | + | − |

In the state A, since electric currents flow through the primary and secondary windings of the high-frequency transformer 3H as indicated by arrows of solid line in FIG. 4, a voltage of positive polarity is generated at node A of FIG. 4. In the state C, the same relation exists. In contrast, it will be readily inferred that in the states B and C, voltages of negative polarity are generated at node A mentioned above. The potential at node A, therefore, changes in a rectangular waveform like the waveform (c) in accordance with the time-course change of the combinations of the ON-OFF states of the individual switches 21 through 24 illustrated in FIGS. 5(a) and (b).

A mean value (DC) voltage $E_o$ illustrated in FIG. 5(c) is obtained when the modulated rectangular waveform generated at the point A is deprived of the AC component by the use of a filter composed of a reactor 8 and a capacitor 10 as illustrated in FIG. 4 and is then averaged.

Let $E_i$ stand for the input voltage, then the relation between the DC output voltage $E_o$ and the phase difference $\theta$ will be represented by the following formula (1).

$$E_o = (1 - 2\theta/\pi) E_i N2/N1 \tag{1}$$

Figure 6:
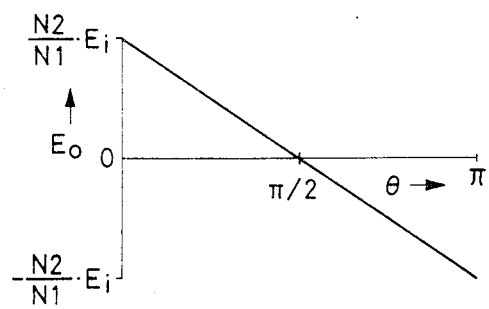
FIG. 6 is a graph showing the relation between the output voltage $E_o$ and the phase difference $\theta$.

FIG. 6 shows the relation between the output voltage $E_o$ and the phase difference $\theta$ in accordance with the formula (1) given above. It is noted from the graph that the output voltage $E_o$ is a first-order function of the phase difference $\theta$ and is linearly varied throughout the entire range from the positive voltage to the negative voltage.

By the embodiment of FIG. 4, a power source which is enabled to derive from a DC power source of a certain voltage a DC output, a sine-wave AC output, and other similar outputs of desired voltages different from the voltage of the DC source by suitably adjusting the phase difference $\theta$ can be easily constructed.

Figure 7:
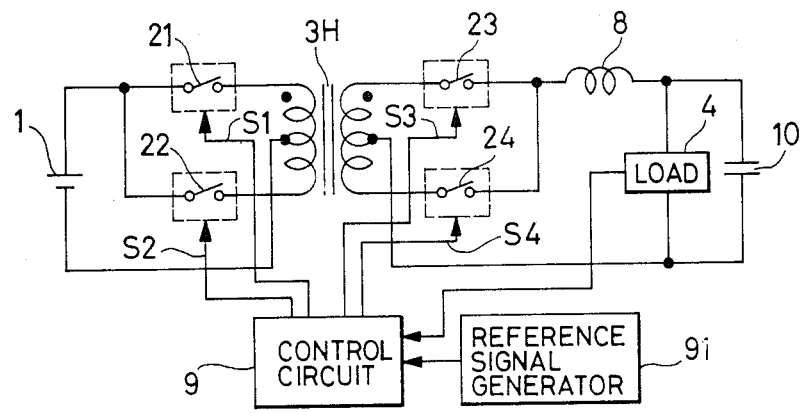
FIG. 7 is a block diagram illustrating another embodiment of the present invention.

FIG. 7 is a block diagram illustrating a specific embodiment of the present invention. In the diagram, the same symbols as used in FIG. 4 denote identical parts.

Between the power source 1 and the primary winding of the high-frequency transformer 3H, the switch 21 and the switch 22 are connected similarly to those in FIG. 4. The switch 23 and the switch 24 are connected, similarly to those of FIG. 4, to the secondary winding of the transformer 3H and the reactor 8 is connected between the load 4 and the switch 23 and the switch 24. The switches 21, 22, 23, and 24 are driven by a control device 9 on the same timing as described above with reference to FIG. 4 and FIG. 5.

The control device 9, as described more fully later on, controls the output voltage and current by comparing the output voltage or current signal with the sine-wave, DC, or other reference signal issued from a reference signal generating device 91 and accordingly regulating the phase difference between the switch signal to be given to the switches 21 and 22 and the switch signal to be given to the switches 23 and 24.

Figure 9:
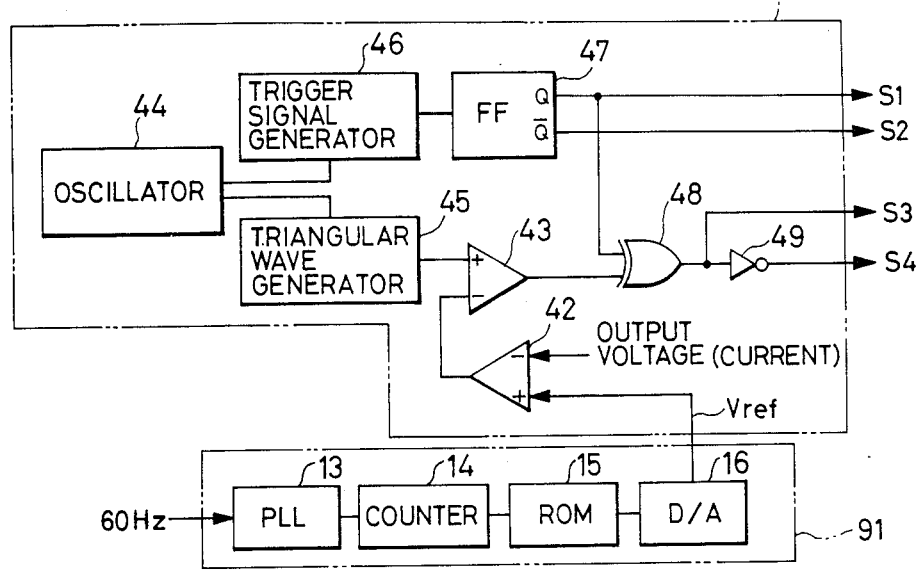
FIG. 9 is a block diagram illustrating a typical control circuit used in the embodiments of FIG. 7 and FIG. 8.

FIG. 9 illustrates a specific configuration of the control circuit 9 and the reference signal generator 91 suitable for the power source of FIG. 7 being used as a commercial AC power source.

The sine-wave reference signal generator 91 comprises a PLL (phase locked loop) 13, a counter 14, a ROM (read only memory) 15, and a D/A converter (digital-to-analog converter) 16. The PLL 13 receives a commercial AC of 60 Hz and, in response thereto, generates a high-frequency signal raised to 1,024 ($=2^{10}$) times of the original frequency, for example. The counter 14 makes counts pulses of this signal on the binary basis and designates an address of the ROM 15 with the digits (10 bits in the present case) of each counter output count. In the addresses of the ROM 15, the values of amplitude in 1,024 phase points into which one cycle of sine wave is divided are stored in advance. These values of amplitude are sequentially read out and supplied to the D/A converter 16. The D/A converter 16, therefore, is enabled to issue a sine-wave reference signal $V_{ref}$. Of course, the sine-wave reference signal generator need not be restricted to the construction described above and may be in some other suitable construction.

To a noninverting input terminal of an error amplifier 42, the sine-wave reference signal $V_{ref}$ is supplied. To an inverting input terminal of the error amplifier 42 is fed in the output voltage (or current) applied to the load 4 illustrated in FIG. 7. The error output from the error amplifier 42 is fed to an inverting input terminal of a comparator 43.

An oscillator 44 generates a signal of amply high frequency (such as, for example, 200 KHz) as compared with the frequency of the reference signal $V_{ref}$ and, based on this signal, a triangular wave generator 45 and a trigger signal generator 46 generate a triangular signal (FIG. 10(b)) and a trigger signal (FIG. 10(a)) which are in a mutually synchronized relation.

The triangular wave is supplied to the noninverting input terminal of the comparator 43. The comparator 43 compares the triangular wave and the error output and, only during the period in which the triangular wave is larger than the error output, feeds out a rectangular waveform (FIG. 10(c)) rising to a high level. The rising edge of the rectangular wave c is delayed in time so that the duration of the rectangular waves is shortened, in proportion to any decrease in the output voltage applied to the load 4.

Figure 10:
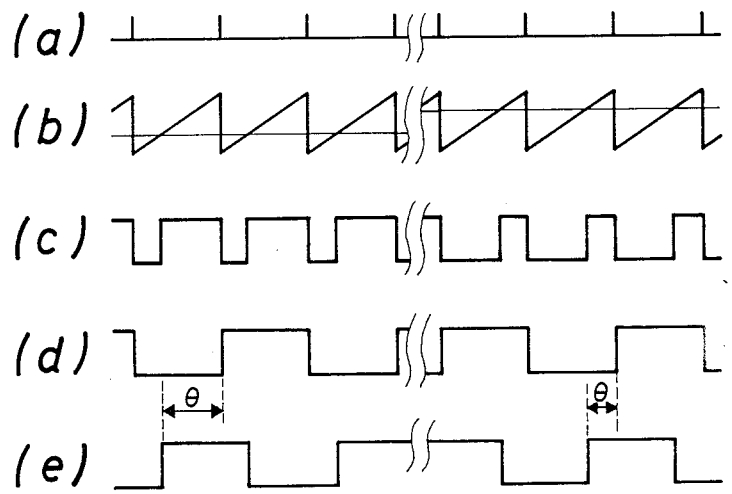
FIGS. 10a to 10e are time charts depicting the operation of the control circuit of FIG. 9.

A FF (flipflop) 47 is triggered by the trigger signal and generates at the Q output terminal thereof a rectangular waveform having the duty thereof halved as illustrated in the waveform (d) of FIG. 10. This Q output serves as a signal S1 for effecting the ON-OFF control of the switch 21 of FIG. 7. The $\overline{Q}$ output of a reverse phase relative to the Q output serves as a signal S2 for controlling the switch 22.

The Q output and the output c of the comparator 43 are supplied to an XOR (exclusive OR circuit) logic gate 48 and converted therein into an ON-OFF control signal S3 for the switch 23 as illustrated in the waveform (e) of FIG. 10. The control signal S3 is inverted by an inverter 49 into an ON-OFF control signal S4 for the switch 24.

When the switches 21-24 of FIG. 7 are subjected to ON-OFF control using the switch control signals S1 through S4 obtained as described above, the utput voltage is always made to equal the reference signal $V_{ref}$. This is because, should the output voltage have increased beyond $V_{ref}$ for this instance the phase difference $\theta$ is increased and so the output voltage supplied is decreased in proportion to the excess of output voltage applied to the load 4. When the reference signal $V_{ref}$ is in the form of a sine wave, so is the output voltage. And the same relation holds true when the reference signal is in the form of DC.

Figure 8:
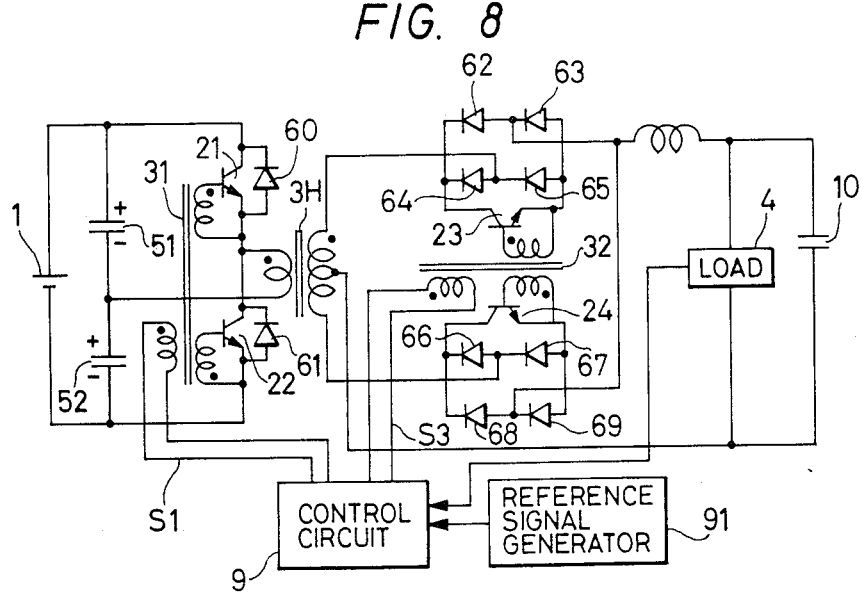
FIG. 8 is a block diagram illustrating yet another embodiment of the present invention.

FIG. 8 is a block diagram illustrating another embodiment of this invention using bipolar (npn) transistors 21-24 as switching elements. Diodes 60-69 serve the purpose of enabling the transistors 21-24 to function as bidirectional switching elements.

In FIG. 8, while the secondary circuit of the high-frequency transformer 3H is identical with that of FIG. 7, the primary circuit thereof is different from that of FIG. 7 in that it uses switches 21 and 22 disposed in a half-bridge connection.

Capacitors 51 and 52 are serially connected to the DC power source 1 and are severally charged to one half of the voltage of the DC power source to function as operating power sources respectively for the switches 21 and 22.

The transistors 21 and 22 connected to the primary winding of the high frequency transformer 3H, and the transistors 23 and 24 connected to the secondary winding of the same transformer 3H, receive drive signals designated S1 and S3 of such rectangular waveforms as illustrated in (d) and (e) of FIG. 10 which are respectively supplied by the control circuit 9 via controlling transformers 31 and 32. As the result, a forward bias voltage is generated between the base and the emitter of one of the transistors 21 and 22 so that, for example, the one transistor 21 will assume an ON state and the other transistor 22 an OFF state. The primary winding of the high-frequency transformer 3H, therefore, receive electric current of forward direction supplied from the capacitor 51 via the transistor 21. When the driving signal is inverted, the transistor 22 assumes an ON state and the transistor 21 an OFF state conversely relative to the former case, with the result that the electric current of the primary winding of the high-frequency transformer 3H will be supplied in the reverse direction from the other capacitor 52 via the transistor 22.

In this case, since the two secondary windings of the controlling transformer 31, i.e. the base windings of the two transistors 21 and 22 are tightly coupled, if one transistor is turned on, a reverse bias voltage is generated between the base and the emitter of the other transistor through the coupling of the secondary windings. Thus, the transistors 21 and 22 are never allowed to assume the state of electric conduction at the same time. This condition similarly applies to the transistors 23 and 24. Since the transistors serving as paired switching elements, therefore, are not required to provide any special dead time for preventing simultaneous occurrence of electric conduction therein, their switching frequency can be substantially increased. While FIG. 8 depicts an embodiment using bipolar transistors as switching elements, FETs (field effect transistors) and other similar switching elements may be adopted instead without any difficulty.

In the embodiments of FIGS. 4, 7 and 8, the capacitor 10 may be omitted when the harshness of the demand for the voltage waveform applied to the load is low or when the load is capacitive.

As clearly noted from the description given above, adoption of the power source of the type using a high frequency phase difference control as illustrated in FIGS. 4, 7, or 8 permits the transformer serving for mutual isolation of the DC power source side and the load side to be rated for a higher frequency and so to be constructed in decreased size and weight, and enables the switching operation heretofore effected with a complicated device to be carried out efficiently with a simple device, thereby realizing an economic power source. Further, since the power source of the configuration of FIG. 4, FIG. 7, or FIG. 8 incorporates therein no unidirectional circuit element such as a diode or a rectifier, it enables the electric power to be transmitted in either direction and prevents the reactive power from giving rise to a surge voltage. When this power source is adopted as an uninterruptible power source, it offers an advantage that while the commercial power source is normally operating, the DC power source can be charged from the commercial power source.

What is claimed is:

1. A power source of the type using a high-frequency phase control, which comprises:

a high-frequency transformer having a primary winding and a secondary winding, first and second switch means each connected at one terminal thereof to the opposite terminals of the primary winding of said high-frequency transformer and each connected at the other terminal thereof to the other, with the common point of connection of said first and second switching means being adapted for connection to a constant polarity source of voltage, and with there being a center tap in said primary winding of said high-frequency transformer adapted for connection to a reference source of voltage, third and fourth switch means each connected at one terminal thereof to the opposite terminals of the secondary winding of said high-frequency transformer and each connected at the other terminal thereof to the other, a reactor connected between the common point of connection of said third and fourth switch means and one of a pair of output terminals, a center tap of said secondary winding of said high-frequency transformer connected to the other of the pair of output terminals, a controlling device for effecting ON-OFF switching control alternately of said first and second switch means and, at the same time, effecting ON-OFF switching control alternately of said third and fourth switch means with a selected phase difference with reference to the switching of said first and second switch means, said controlling device comprising:

an error amplifier for generating a deviation signal representing any deviation from a reference signal of any output voltage appearing between said pair of output terminals, a flipflop for generating a first rectangular wave controlling signal possessing an amply high frequency as compared with the frequency of said reference signal and exhibiting a duty ratio of ½, and a secondd rectangular wave controlling signal of a reverse phase relative to the phase of said first rectangular wave controlling signal, means for generating a triangular wave signal which is synchronized to the first and second rectangular wave controlling signals, a comparator for comparing the triangular wave and the deviation signal to generate a preliminary rectangular wave signal in response to the difference in their amplitude with a duty ratio depending on the amount of this difference, a logic circuit being supplied with the preliminary rectangular wave signal and one of the first and second rectangular wave controlling signals to provide third and fourth rectangular wave controlling signals of opposite phase and with a phase differing from that of the first and second rectangular wave controlling signal depending on the duty ratio of the preliminary rectangular signal, and means for effecting ON-OFF control of said first through fourth switch means in accordance with said first through fourth rectangular wave controlling signals.

2. A power source using high-frequency phase control according to claim 1, wherein a capacitor is connected between the pair of output terminals.

3. A power source using high-frequency phase control according to claim 1, wherein said logic circuit performs an EXCLUSIVE OR logic function.

4. A power source of the type using a high-frequency phase control, which comprises:

a high-frequency transformer having a primary winding and a secondary winding, first and second switch means each connected at one terminal thereof to the other to be in series, the other terminal of the first switch means being adapted for connection to a first constant polarity source of voltage, and the other terminal of the second switch means being adapted for connection to a second constant polarity source of voltage with the primary winding of said high-frequency transformer having a first terminal connected between the common points of connection of the first and second switch means and a second terminal adapted for connection to a reference voltage, third and fouth switch means each connected at one terminal thereof to the opposite terminals of the secondary winding of said high-frequency transformer and each connected at the other termninal thereof to the other, a reactor connected between the common point of connection of said third and fourth switch means and one of a pair of output terminals, a center tap of the second winding of said high-frequency transformer being connected to the other of the pair of output terminals, a controlling device for effecting ON-OFF switching control alternately of said first and second switch means and, at the same time, effecting ON-OFF switching control alternately of said third and fourth switch means with a selected phase difference with reference to the switching of said first and second switch means, said controlling device comprising:

an error amplifier for generating a deviation signal representing any deviation from a reference signal of any output voltage appearing between said pair of output terminals, a flipflop for generating a first rectangular wave controlling signal possessing an amply high frequency as compared with the frequency of said reference signal and exhibiting a duty ratio of ½, and a second rectangular wave controlling signal of a reverse phase relative to the phase of said first rectangular wave controlling signal, means for generating a triangular wave signal which is synchronized to the first and second rectangular wave controlling signals, a comparator for comparing the triangular wave and the deviation signal to generate a preliminary rectangular wave signal in response to the difference in their amplitude with a duty ratio depending on the amount of this difference, a logic circuit being supplied with the preliminary rectangular wave signal and one of the first and second rectangular wave controlling signals to provide third and fourth rectangular wave controlling signals of opposite phase and with a phase differing from that of the first and second rectangular wave controlling signal depending on the duty ratio of the preliminary rectangular signal, and means for effecting ON-OFF control of said first through fourth switch means in accordance with said first through fourth rectangular wave controlling signals.

5. A power source using high-frequency phase control according to claim 4, wherein a capacitor is connected between the pair of output terminals.

6. A power source using high-frequency phase control according to claim 4, wherein said logic circuit performs an EXCLUSIVE OR logic function.

* * * * *